United States Patent
Burgess et al.

(10) Patent No.: US 10,286,305 B2
(45) Date of Patent: *May 14, 2019

(54) CONTROLLER FOR VIDEO GAME CONSOLE

(71) Applicant: Ironburg Inventions, Ltd., Wincanton, Somerset (GB)

(72) Inventors: Simon Burgess, Leicester (GB); Duncan Ironmonger, Atlanta, GA (US)

(73) Assignee: Ironburg Inventions LTD. (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,789

(22) Filed: Jun. 30, 2015

(65) Prior Publication Data

US 2015/0297993 A1    Oct. 22, 2015

Related U.S. Application Data

(63) Continuation of application No. 14/141,840, filed on Dec. 27, 2013, now Pat. No. 9,089,770, which is a continuation of application No. 13/162,727, filed on Jun. 17, 2011, now Pat. No. 8,641,525.

(51) Int. Cl.
| | |
|---|---|
| A63F 13/24 | (2014.01) |
| A63F 13/20 | (2014.01) |
| A63F 13/21 | (2014.01) |
| A63F 13/90 | (2014.01) |
| A63F 9/24 | (2006.01) |

(52) U.S. Cl.
CPC ............. *A63F 13/24* (2014.09); *A63F 9/24* (2013.01); *A63F 13/06* (2013.01); *A63F 13/20* (2014.09); *A63F 13/21* (2014.09); *A63F 13/90* (2014.09); *A63F 2009/2402* (2013.01); *A63F 2300/1006* (2013.01); *A63F 2300/1043* (2013.01)

(58) Field of Classification Search
CPC .......... A63F 2300/10; A63F 2300/1043; A63F 13/06; A63F 13/08; A63F 13/24; A63F 13/90; A63F 13/20–13/21
See application file for complete search history.

(56) References Cited

U.S. PATENT DOCUMENTS

| | | |
|---|---|---|
| 3,647,211 A | 3/1972 | Doessel et al. |
| 4,032,728 A | 6/1977 | Oelsch |
| 4,455,768 A | 6/1984 | Salomon |

(Continued)

FOREIGN PATENT DOCUMENTS

| | | |
|---|---|---|
| JP | 1020951 | 1/1998 |
| WO | 2008131249 | 10/2008 |

OTHER PUBLICATIONS

"Review: Scuf Xbox 360 Controller", by Dave Burns, published Oct. 20, 2010. Source https://web.archive.org/web/20101022215104/ http://www.xboxer360.com/features/review-scuf-xbox-360-controller/.*

(Continued)

*Primary Examiner* — Steven J Hylinski
(74) *Attorney, Agent, or Firm* — Parks IP Law LLC

(57) ABSTRACT

An improved controller for a game console that is intended to be held by a user in both hands in the same manner as a conventional controller, which has controls on the front operable by the thumbs, and has two additional controls located on the back in positions to be operated by the middle fingers of a user.

21 Claims, 2 Drawing Sheets

(56) References Cited

U.S. PATENT DOCUMENTS

| | | | |
|---|---|---|---|
| 4,552,360 A * | 11/1985 | Bromley et al. | 463/38 |
| 4,844,476 A * | 7/1989 | Becker | A63F 13/04 |
| | | | 345/156 |
| 4,979,634 A | 12/1990 | Begley | |
| 5,207,426 A * | 5/1993 | Inoue | A63F 13/06 |
| | | | 345/184 |
| 5,478,127 A | 12/1995 | Chase | |
| 5,551,693 A | 9/1996 | Goto | |
| 5,577,962 A * | 11/1996 | Kounoe | A63F 9/0291 |
| | | | 434/20 |
| D377,198 S * | 1/1997 | Oikawa et al. | D14/401 |
| 5,651,612 A | 7/1997 | Braun | |
| 5,670,988 A * | 9/1997 | Tickle | 345/157 |
| 5,716,274 A * | 2/1998 | Goto | A63F 13/06 |
| | | | 345/169 |
| D393,291 S * | 4/1998 | Kung | D14/401 |
| 5,773,769 A | 6/1998 | Raymond et al. | |
| 5,800,723 A | 9/1998 | Juskey et al. | |
| 5,820,462 A * | 10/1998 | Yokoi et al. | 463/37 |
| 5,874,906 A * | 2/1999 | Willner et al. | 341/22 |
| D409,183 S * | 5/1999 | Chen | D14/401 |
| 5,923,317 A * | 7/1999 | Sayler et al. | 345/156 |
| 5,984,548 A * | 11/1999 | Willner | G06F 3/0219 |
| | | | 348/E5.103 |
| 5,984,785 A * | 11/1999 | Takeda et al. | 463/38 |
| 5,989,123 A | 11/1999 | Tosaki | |
| D419,985 S * | 2/2000 | LaCelle et al. | D14/401 |
| 6,019,680 A * | 2/2000 | Cheng | 463/37 |
| 6,102,802 A * | 8/2000 | Armstrong | A63F 13/06 |
| | | | 463/37 |
| 6,102,803 A * | 8/2000 | Takeda | A63F 13/02 |
| | | | 345/156 |
| D431,604 S * | 10/2000 | Chan | D21/329 |
| 6,135,886 A * | 10/2000 | Armstrong | 463/37 |
| 6,153,843 A | 11/2000 | Date et al. | |
| 6,261,180 B1 * | 7/2001 | Lebensfeld et al. | 463/49 |
| 6,267,673 B1 * | 7/2001 | Miyamoto et al. | 463/31 |
| 6,280,327 B1 * | 8/2001 | Leifer et al. | 463/39 |
| 6,342,009 B1 | 1/2002 | Soma | |
| 6,362,813 B1 | 3/2002 | Worn et al. | |
| 6,364,771 B1 | 4/2002 | Lee et al. | |
| 6,394,906 B1 | 5/2002 | Ogata | |
| 6,512,511 B2 * | 1/2003 | Willner et al. | 345/169 |
| 6,524,186 B2 | 2/2003 | Takatsuka | |
| 6,524,187 B2 | 2/2003 | Komata | |
| 6,549,191 B2 * | 4/2003 | Leman | 345/168 |
| 6,580,421 B1 * | 6/2003 | Leman | 345/168 |
| 6,637,877 B1 | 10/2003 | Hartley et al. | |
| 6,682,426 B2 * | 1/2004 | Goto | G05G 9/047 |
| | | | 463/37 |
| 6,760,013 B2 * | 7/2004 | Willner et al. | 345/169 |
| D502,468 S † | 3/2005 | Knight | |
| 7,235,012 B2 * | 6/2007 | DiDato | 463/38 |
| 7,271,461 B2 | 9/2007 | Dutta | |
| D572,710 S * | 7/2008 | Li | D14/401 |
| 7,407,439 B1 * | 8/2008 | Ochoa | 463/37 |
| 7,471,216 B2 * | 12/2008 | Chen | A63F 13/06 |
| | | | 244/190 |
| 7,473,180 B2 * | 1/2009 | Himoto et al. | 463/37 |
| 7,488,254 B2 * | 2/2009 | Himoto | A63F 13/02 |
| | | | 273/148 R |
| 7,774,155 B2 * | 8/2010 | Sato et al. | 702/127 |
| 7,804,484 B2 * | 9/2010 | Martinez et al. | 345/156 |
| 7,859,514 B1 * | 12/2010 | Park | 345/156 |
| 7,927,216 B2 * | 4/2011 | Ikeda et al. | 463/38 |
| 7,942,745 B2 * | 5/2011 | Ikeda et al. | 463/38 |
| 8,366,547 B2 * | 2/2013 | Haswell | A63F 13/803 |
| | | | 463/36 |
| 8,384,121 B2 | 2/2013 | Tischler et al. | |
| 8,493,326 B2 * | 7/2013 | Martinez | A63F 13/06 |
| | | | 345/168 |
| 8,641,525 B2 | 2/2014 | Burgess et al. | |
| D711,881 S | 8/2014 | Bellinghausen | |
| 9,089,770 B2 | 7/2015 | Burgess et al. | |
| 9,289,688 B2 | 3/2016 | Burgess et al. | |
| 2001/0008848 A1 * | 7/2001 | Armstrong | A63F 13/06 |
| | | | 463/37 |
| 2001/0023205 A1 * | 9/2001 | Kikukawa | A63F 13/06 |
| | | | 463/37 |
| 2001/0025778 A1 | 10/2001 | Ono | |
| 2002/0086627 A1 | 6/2002 | Andrews et al. | |
| 2002/0128064 A1 * | 9/2002 | Sobota | A63F 13/06 |
| | | | 463/37 |
| 2005/0255918 A1 * | 11/2005 | Riggs | A47C 3/16 |
| | | | 463/37 |
| 2006/0040740 A1 * | 2/2006 | DiDato | 463/37 |
| 2006/0116204 A1 * | 6/2006 | Chen et al. | 463/37 |
| 2008/0070686 A1 * | 3/2008 | Satsukawa | A63F 13/005 |
| | | | 463/37 |
| 2008/0261695 A1 * | 10/2008 | Coe | 463/37 |
| 2010/0073283 A1 | 3/2010 | Enright | |
| 2010/0298053 A1 | 11/2010 | Kotkin | |
| 2012/0142417 A1 * | 6/2012 | Haswell et al. | 463/37 |
| 2015/0238855 A1 | 8/2015 | Uy | |

OTHER PUBLICATIONS

Search and Examination Report for Application No. GB1011078.1 dated, May 16, 2011.

Rapid Fire Mod for Wireless Xbox 360 Controller Step by Step posted Jul. 13, 2008.

Xbox 360 Wireless Controller Tour of May 13, 2005.

Coles, Olin, "Thrustmaster Run-N-Drive PC/PS3 Wireless Gamepad" BenchmarkReviews.com (2009).

"Rapid Fire Mod for Wireless Xbox 360 Controller," forum on xbox-scene.com, (2008).

Review: Scuf Xbox 360 Controller by Dave Burns, published Oct. 20, 2010. Source https://www.xboxer360/features/review-scuf-xbox-360-controller/.

Razer Sabertooth Review, published Mar. 11, 2013 by Harry Butler, available at http://www.bit-tech.net/hardware/2013/03/11/razer-sabertooth-review/1.

"AlphaGrip AG-5 handheld keyboard and mouse," by Ryan Paul, published Mar. 15, 2006. Source: http://arstechnica.com/gadgets/2006/03/alphagrip/.

Elongated—definition of elongated; www.thefreedictionary.com/elongated.

English Translation of Japanese Patent Publication JPH1020951 to Tsuchiya Koji cited in related Inter Partes Review matter.

File History of U.S. Appl. No. 13/162,727.

Dark Watcher, History of the Game Controller, Video Game Console Library, https://web.archive.org/web/20081021044659/http://www.videogameconsolelibrary.com/artcontroller.htm.

U.S. Appl. No. 61/179,551.

Non-Patent Publication "Xbox 360 Wireless Controller by Microsoft," https://www.gamestop.com/xbox-360/accessories/xbox-360-wireless-controller/40647#media.

Non-Patent Publication "Nintendo Game Boy Advance, model AGB-001," http://collection.sciencemuseum.org.uk/objects/co8184138/nintendo-game-boy-advance-model-agb-001-games-console.

Decision of Petition on Inter Partes Review in related U.S. Pat. No. 8,614,525.

Patent Owner Preliminary Response filed in related Case No. IPR2018-00354 before the USPTO Patent Trial and Appeal Board dated Mar. 28, 2018.

Highline Polycarbonate, http://highlinepc.com/polycarbonate-versus-acrylic-ice-hockey-spectator-shielding/, Polycarbonate versus Acrylic for ice hockey spectator shielding, pp. 1-3, Jun. 20, 2018.

A & C Plastics, Inc., https://www.acplasticsinc.com/informationcenter/r/acrylic-vs-polycarbonate, Acrylic Sheeting vs Polycarbonate Sheeting, pp. 1-6, Jun. 18, 2018.

EMCO Industrial Plastics, Inc., https://www.emcoplastics.com/polycarbonate/, Polycarbonate (PC)—Thermoplastic Polycarbonate Polymers, pp. 1-10, Jun. 20, 2018.

Alfred B. Swanson, M.D., Ivan B. Matev, M.D., G. De Groot, M.D., The Strength of the Hand, Orthopaedic Research Department, Blodgett Memorial Hospital, pp. 145-153.

(56) References Cited

OTHER PUBLICATIONS

File History of U.S. Pat. No. 9,289,688.
File History of U.S. Pat. No. 9,352,229.

\* cited by examiner
† cited by third party

CONTROLLER FOR VIDEO GAME CONSOLE

BACKGROUND OF THE INVENTION

The present invention relates to video game consoles, in particular to hand held controllers for video game consoles.

Conventional controllers for most game consoles are intended to be held and operated by the user using both hands. A conventional controller will generally comprise a hard outer case with a plurality of controls mounted about the controller. Typically the controls include buttons, analogue control sticks, bumpers, and triggers. An example of a conventional controller is shown in FIG. 1.

As can be seen in FIG. 1, all of the controls are mounted on the front and top edge of the controller 1. Specifically, there are left and right analogue thumb sticks 2, 3 which normally control movement and are intended to be operated by the user's left and right thumb respectively. There are four buttons 4, located on a front right portion of the controller 1 which normally control additional actions and are intended to be operated by the user's right thumb. There is a direction pad 5 located on the lower portion of the front left of the controller 1. The direction pad 5 is intended to be operated by the user's left thumb, typically either as an alternative to the left thumb stick 2 or to provide additional actions. There is a left trigger 6, a right trigger 7, a left bumper 8, and a right bumper 9 located on the top edge of the controller 1. The left and right triggers 6, 7 are typically operated by the user's index fingers. The left and right bumpers 8, 9 may also be operated by the user's index fingers.

The only way to operate the four buttons 4 is for the user to remove his or her right thumb from the right thumb stick 3. This takes time and, in some games, can cause a loss of control. This is a particular problem in games where the right thumb stick 3 is used for aiming. A similar problem may arise in games where the direction pad 5 provides additional actions and the user has to remove his or her thumb from the left thumb stick 2 in order to operate the direction pad 5.

In light of the above, there is a need for an improved controller which removes the need for a user to remove his or her thumb from the left or right thumb stick 2, 3 in order to operate additional actions controlled by the four buttons 4 and/or the direction pad 5.

SUMMARY OF THE INVENTION

The present invention provides a hand held controller for a video game console having a hard outer case and a plurality of controls located on the front and top edge of the controller. The controller is shaped to be held in both hands of the user such that the user's thumbs are positioned to operate controls located on the front of the controller and the user's index fingers are positioned to operate controls located on the top edge of the controller. The controller further includes one or more additional controls located on the back of the controller in a position to be operated by the user's other fingers.

In one embodiment, each additional control is an elongate member which is inherently resilient and flexible such that it can be displaced by a user to activate control function.

Preferably, each elongate member is mounted within a respective recess located in the case of the controller.

Preferably, each elongate member comprises an outermost surface which is disposed in close proximity to the outermost surface of the controller such that the user's finger may be received in said respective recess.

Preferably, each elongate member has a thickness less than 10 mm thick, more preferably less than 5 mm thick, and most desirably between 1 mm and 3 mm.

Preferably, there are two additional controls which are elongate members that are parallel to each another. In another embodiment, the elongate members converge towards the front end of the controller with respect to one another.

Optionally, a portion of each of the elongate members is in registry with a switch mechanism disposed within the controller, such that displacement of the elongate member activates the switch mechanism.

Optionally, a switch mechanism is disposed between the elongate members and an outer surface of the controller.

The controller of the present invention may be very similar to controllers according to the prior art. In particular, the outer case of the controller and the type, number and positioning of the controls located on the front and top edge of the controller may be the same as a controller according to the prior art, as described above and as illustrated in the figures.

The controller of the present invention is particularly advantageous over controllers according to the prior art as it comprises one or more additional controls located on the back of the controller in a position to be operated by middle fingers of a user. The additional controls may either replicate the functions of one or more of the controls located on the front or top edge of the controller or provide additional functionality.

In a preferred embodiment of the invention the additional controls replicate the function of a control located on the front of the controller. This means that a user does not need to remove his or her thumb from one of the thumb sticks in order to operate the buttons and/or direction pad located on the front of the controller and can instead perform the function by manipulating an additional control located on the back of the controller with a finger.

Alternatively, the additional controls may provide additional functionality in that they do not replicate the function of controls located on the front or top of the controller but may perform different functions. In this manner a controller according to the present invention may provide more functions than prior art controllers.

Preferably, the controls located on the back of the controller are paddle levers. Suitable paddle levers may be formed integrally with the outer case of the controller or may be substantially separate from the outer case. This may be done in any manner apparent to the person skilled in the art. However, it is to be appreciated that the additional controls may comprise any other control suitable for use by a hand held controller.

Advantageously, if the additional controls are paddle levers, they will be formed such that they are substantially vertically aligned with respect to the controller. This may allow the most ergonomically efficient activation of the paddle levers by the middle fingers of the user.

Further features and advantages of the present invention will be apparent from the specific embodiment illustrated in the drawings and discussed below.

DETAILED DESCRIPTION OF THE INVENTION

The particular embodiment described below and illustrated by FIGS. 2 and 3 serves to further illustrate the invention, to provide those of ordinary skill in the art with a complete disclosure and description of the devices claimed herein, and is not intended to limit the scope of the invention. For example, the additional controls are described below as two paddle levers but the term "control" as used in the claims, unless otherwise made clear in the claim, refers to paddle levers as well as other controls such as buttons, analogue control sticks, bumpers, and triggers.

Figure 1:
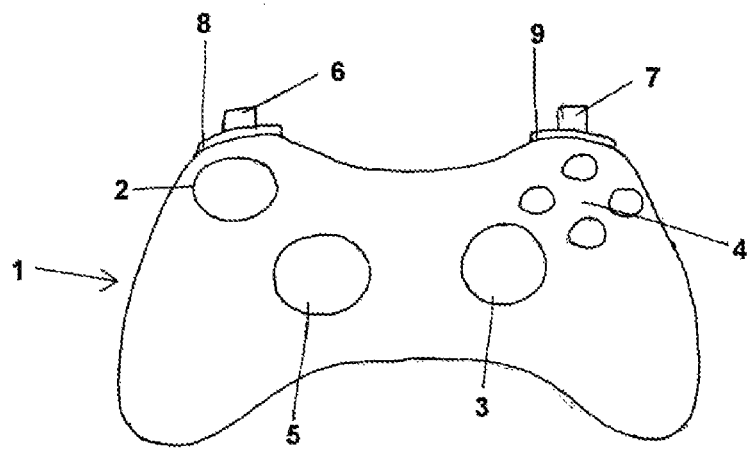
FIG. 1 is a schematic illustration of the front of a conventional game controller according to the prior art.
Figure 2:
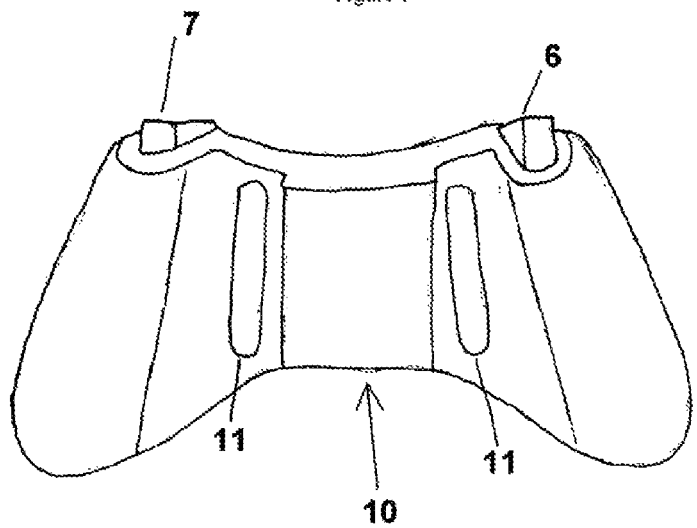
FIG. 2 is a schematic illustration of the back of a game controller according to the present invention.
Figure 3:
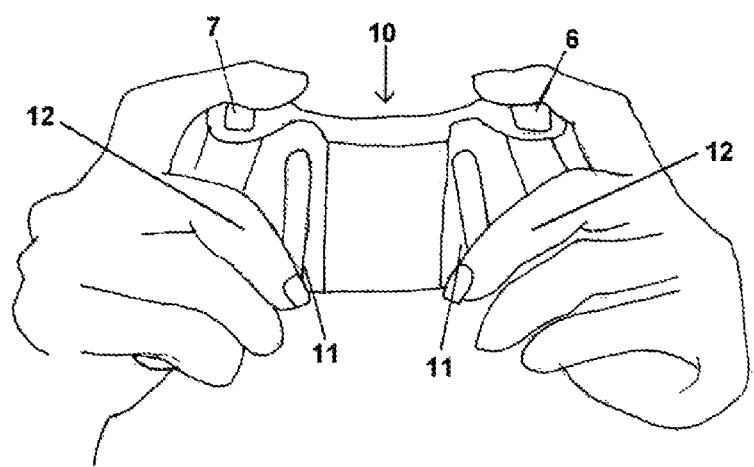
FIG. 3 is a schematic illustration of the back of a game controller according to the present invention as held and operated by a user.

The game controller 10 according to the present invention is illustrated in FIGS. 2 and 3. The front of the game controller 10 of FIGS. 2 and 3 is the same as a conventional controller 1, as illustrated in FIG. 1 and as discussed above. Therefore, where appropriate the same reference numerals have been used to indicate the features of the controller according to the present invention 10 that are identical to the features of a conventional controller 1.

Game controller 10 differs from the conventional controller 1 in that it additionally comprises two paddle levers 11 located on the back of the controller. The paddle levers 11 are vertically orientated with respect to the controller 10 and are positioned to be operated by the middle fingers of a user 12, as shown in FIG. 3.

In one embodiment the paddles 11 are formed from a thin flexible material such as a plastics material for example polyethylene. Preferably, the paddles 11 are less than 10 mm thick, but may be less than 5 mm thick, and more preferably are 3 mm thick or less.

The paddles 11 are inherently resilient, which means that they return to an unbiased position when not under load. A user may displace or depress either of the paddles 11 by engaging an outer surface thereof; such displacement causes the paddle 11 to activate a switch mechanism mounted within the body of the controller 10. The paddles 11 are mounted within recesses located on the case of the controller 10; and are disposed in close proximity to the outer surface of the controller body. In this way a user may engage the paddles 11 with the tips of the fingers, preferably the middle fingers, without compromising the user's grip on the controller 10. While the example shows the paddles 11 engaged by the middle fingers, they could also be engaged by the index, ring, or little fingers. The index fingers may also engage trigger style controls mounted on the top edge of the controller 10 while the thumbs may be used to activate controls on the front of the controller 10.

The paddles 11 are elongate in shape and substantially extend in a direction from the top edge to bottom edge of the controller 10. In one embodiment the paddles are orientated parallel with each other. In an alternative embodiment the paddles are orientated such that they converge towards the top edge with respect to each other. This elongate shape allows a user to engage the paddles with any of the middle, ring, or little finger; it also provides that different users having different size hands can engage with the paddles in a comfortable position thereby reducing the effects of prolonged or repeated use such as repetitive strain injury.

In one embodiment, the paddle levers 11 replicate the functions of two of the four buttons 4 located on the front of the controller 10 and thereby allow a user to operate the functions of the relevant buttons using his or her middle fingers 12, without the need to remove either of his or her thumbs from the left or right thumb stick 2, 3. In alternative embodiments a paddle lever 11 may activate a new function not activated by a control on the front or top edge of the controller 10.

It is envisaged that the paddles 11 could be fitted to an existing controller 10. In such embodiments the paddles would be mounted on the outer surface of the controller body by means of a mechanical fixing such as a screw or bolt or alternatively bonded or welded to the controller body by adhesive or other suitable means. A switch mechanism would be mounted within the controller in vertical registry with a portion of each paddle. A portion of the switch mechanism may extend through the controller body and be disposed in close proximity or in contact with an innermost surface of the paddle 11.

In alternative embodiments it is envisaged that the paddles 11 would be integrally formed with the controller body, the paddles 11 being configured to be resilient and flexible such that they can be depressed by a user to activate a switch mechanism. This could be achieved by moulding the controller body to have a U-shaped slot extending through the controller body; alternatively a U-shaped slot could be cut into the controller body after the moulding process. Preferably, the paddles 11 would comprise a raised outermost surface with respect to the surrounding area such that a user may locate the paddles 11. This may be achieved by moulding the paddle such that is thicker than the surrounding area. It will be recognised that as used herein, directional references such as "top", "bottom", "front", "back", "end", "side", "inner", "outer", "upper", and "lower" do not limit the respective features to such orientation, but merely serve to distinguish these features from one another.

Modifications and variations of the present invention will be apparent to those skilled in the art from the forgoing detailed description. All modifications and variations are intended to be encompassed by the following claims. All publications, patents, and patent applications cited herein are hereby incorporated by reference in their entirety.

What is claimed is:

1. A video game controller, comprising:
an outer case comprising:
    a front and a back, wherein the back is opposite the front;
    a top edge and a bottom edge, wherein the top edge is opposite the bottom edge;
    a first handle adjacent a first side edge and a second handle adjacent a second side edge, wherein the first side edge is opposite the second side edge;
    wherein the back comprises a recessed portion that is recessed towards the front with respect to the first handle and the second handle; and
a first back control and a second back control, wherein each of the first back control and the second back control is located at the back, wherein the first back control includes a first elongate member and the second back control includes a second elongate member;
wherein the first elongate member comprises a first longitudinal length and the second elongate member comprises a second longitudinal length; and wherein at least a portion of the first elongate member is positioned at or adjacent a midpoint of a first transition edge between the first handle and the recessed portion;

wherein at least a portion of the second elongate member is positioned at or adjacent a midpoint of a second transition edge between the second handle and the recessed portion; and wherein each of the first elongate member and the second elongate member is respectively rigidly connected to the back of the outer case by a first rigid connection and a second rigid connection, wherein the first rigid connection is configured to apply a moment to the first elongate member when a force is applied to a free end of the first elongate member and thereby restrict rotation of the first elongate member; and the second rigid connection is configured to apply a moment to the second elongate member when a force is applied to a free end of the second elongate member and thereby restrict rotation of the second elongate member.

2. The video game controller of claim 1, wherein a top end of each of the first elongate member and the second elongate member that is nearest the top edge is rigidly connected to the back of the outer case.

3. The video game controller of claim 2, wherein the top end of each of the first elongate member and the second elongate member is rigidly connected to the back of the outer case by a screw.

4. The video game controller of claim 1, wherein each of the first elongate member and the second elongate member is a paddle lever.

5. The video game controller of claim 1, the top edge and the bottom edge defining a first linear dimension;
wherein the first elongate member comprises a first length dimension;
wherein the second elongate member comprises a second length dimension; and
wherein the first and second length dimensions are at least half of a magnitude of the first linear dimension.

6. The video game controller of claim 5, wherein:
the first elongate member comprises a first width dimension, the first length dimension being greater than the first width dimension; and
the second elongate member comprises a second width dimension, the first length dimension being greater than the first width dimension.

7. The video game controller of claim 5, wherein the bottom edge includes:
a first convex portion that defines the first handle;
a second convex portion that defines the second handle; and
a medial portion between the first convex portion and the second convex portion.

8. The video game controller of claim 7, wherein the first linear dimension is between the top edge and the medial portion.

9. The video game controller of claim 7, wherein the medial portion is closer to the top edge than a distal end of each of the first convex portion and the second convex portion.

10. A video game controller, comprising:
an outer case comprising:
a front and a back, wherein the back is opposite the front;
a top edge and a bottom edge, wherein the top edge is opposite the bottom edge;
a first handle adjacent a first side edge and a second handle adjacent a second side edge, wherein the first side edge is opposite the second side edge;
wherein the back comprises:
a recessed portion that is recessed towards the front with respect to the first handle and the second handle;
a first transition edge between the first handle and the recessed portion; and
a second transition edge between the second handle and the recessed portion; and
a first back control and a second back control, wherein each of the first back control and the second back control is located at the back, wherein the first back control includes a first elongate member and the second back control includes a second elongate member;
wherein at least a portion of the first elongate member is positioned at or adjacent a midpoint of the first transition edge; and
wherein at least a portion the second elongate member is positioned at or adjacent a midpoint of the second transition edge
wherein each of the first elongate member and the second elongate member is respectively rigidly connected to the back of the outer case by a first rigid connection and a second rigid connection, wherein the first rigid connection is configured to apply a moment to the first elongate member when a force is applied to a free end of the first elongate member and thereby restrict rotation of the first elongate member; and the second rigid connection is configured to apply a moment to the second elongate member when a force is applied to a free end of the second elongate member and thereby restrict rotation of the second elongate member.

11. The video game controller of claim 10, wherein the first elongate member comprises a first longitudinal dimension having a first longitudinal length and the second elongate member comprises a second longitudinal dimension having a second longitudinal length; and
wherein each of the first longitudinal length and second longitudinal length is at least half of a magnitude of a length of a first linear dimension between the top edge and the bottom edge.

12. The video game controller of claim 10, wherein:
a first longitudinal dimension of the first elongate member is aligned with or parallel to the first transition edge; and
a second longitudinal dimension of the second elongate member is aligned with or parallel to the second transition edge.

13. The video game controller of claim 10, wherein each of the first handle and the second handle protrudes outwardly with respect to a plane defined by the recessed portion.

14. The video game controller of claim 10, wherein:
an outer edge of the first elongate member is aligned with or parallel to the first transition edge; and
an outer edge of the second elongate member is aligned with or parallel to the second transition edge.

15. The video game controller of claim 14, wherein:
an inner edge of the first elongate member is aligned with or parallel to the first transition edge; and
an inner edge of the second elongate member is aligned with or parallel to the second transition edge.

16. The video game controller of claim 10, wherein:
an inner edge of the first elongate member is aligned with or parallel to the first transition edge; and an inner edge of the second elongate member is aligned with or parallel to the second transition edge.

17. The video game controller of claim 10, wherein top ends of the first elongate member and the second elongate member are closer to one another than bottom ends of the first elongate member and the second elongate member.

18. The video game controller of claim 10, wherein the first elongate member and the second elongate member are parallel to one another.

19. The video game controller of claim 10, wherein top ends of the first transition edge and the second transition edge are closer to one another than bottom ends of the first transition edge and the second transition edge.

20. A video game controller, comprising:
an outer case comprising:
a front and a back, wherein the back is opposite the front;
a top edge and a bottom edge, wherein the top edge is opposite the bottom edge;
a first handle adjacent a first side edge and a second handle adjacent a second side edge, wherein the first side edge is opposite the second side edge;
wherein the back comprises:
a recessed portion that is recessed towards the front with respect to the first handle and the second handle;
a first transition edge between the first handle and the recessed portion; and
a second transition edge between the second handle and the recessed portion; and
at least one back control at least partially positioned in the recessed portion, wherein the at least one back control includes a first outer edge and a second outer edge;
wherein a point on the first outer edge is positioned at or adjacent a midpoint of the first transition edge;
wherein a point on the second outer edge is positioned at or adjacent a midpoint of the second transition edge; and
wherein the at least one back control is rigidly connected to an outside surface of the back of the outer case by a rigid connection, wherein the rigid connection is configured to apply a moment to the at least one back control when a force is applied to a free end of the at least one back control and thereby restrict rotation of the at least one back control.

21. The video game controller of claim 20, wherein the first outer edge is aligned with or parallel to the first transition edge; and
wherein the second outer edge is aligned with or parallel to the second transition edge.

* * * * *